United States Patent [19]
Hiramitsu et al.

[11] Patent Number: 5,791,682
[45] Date of Patent: Aug. 11, 1998

[54] AIR BAG DEVICE WITH AIR BAG AND INFLATION MOUNTING STRUCTURE

[75] Inventors: Tetsushi Hiramitsu, Aichi; Koji Shiraki; Kazutoshi Hayashi, both of Gifu; Atsushi Nagata, Aichi; Katsunobu Sakane, Aichi; Tadashi Yamamoto, Aichi; Katsumi Sakakida, Aichi; Osamu Hirose, Aichi; Tooru Koyama, Aichi; Yoshiyuki Fujita, Aichi, all of Japan

[73] Assignee: Toyoda Gosei Co., Ltd., Aichi, Japan

[21] Appl. No.: 577,611

[22] Filed: Dec. 22, 1995

[30] Foreign Application Priority Data

Dec. 26, 1994 [JP] Japan .................. 6-322834
Jul. 28, 1995 [JP] Japan .................. 7-193814

[51] Int. Cl.$^6$ ............................................. B60R 21/16
[52] U.S. Cl. ................... 280/728.2; 280/743.1; 280/743.2
[58] Field of Search .................... 280/728.2, 743.1, 280/743.2, 736, 741, 731, 728.1

[56] References Cited

U.S. PATENT DOCUMENTS

| | | | |
|---|---|---|---|
| 5,409,256 | 4/1995 | Gordon et al. | 280/728.2 |
| 5,423,568 | 6/1995 | Zushi et al. | 280/728.2 |
| 5,427,406 | 6/1995 | Zushi et al. | 280/728.2 |
| 5,445,406 | 8/1995 | Jones | 280/728.2 |
| 5,505,483 | 4/1996 | Taguchi et al. | 280/728.2 |
| 5,509,685 | 4/1996 | Boyle, III | 280/728.2 |
| 5,560,643 | 10/1996 | Lang et al. | 280/728.2 |

FOREIGN PATENT DOCUMENTS

| | | | |
|---|---|---|---|
| 1-122750 | 5/1989 | Japan | 280/743.2 |
| 3-136944 | 6/1991 | Japan | 280/728.2 |
| 3-153438 | 7/1991 | Japan | 280/728.2 |
| 3-292236 | 12/1991 | Japan | 280/743.1 |
| 5-270348 | 10/1993 | Japan | 280/736 |

*Primary Examiner*—Peter C. English
*Attorney, Agent, or Firm*—Cushman Darby & Cushman IP Group of Pillsbury Madison & Sutro LLP

[57] ABSTRACT

An air bag device comprises at the center a bag provided with a gas flowing orifice, a pad for receiving the bag in its folded state, an inflator arranged so as to permit gas to be jetted toward the gas flowing orifice of the bag and an inflator insertion hole into which a holding cylinder below the inflator can be inserted and further provided with a retainer for holding the inflator and the bag in their inner periphery and the pad in its outer periphery. The air bag device further includes a holding cloth surrounding the lower holding cylinder of the inflator and formed continuously below the gas flowing orifice of the bag, and a coupling is formed between the peripheral surface of the inflator and peripheral edge of the inflator insertion hole of the retainer.

6 Claims, 10 Drawing Sheets

AIR BAG DEVICE WITH AIR BAG AND INFLATION MOUNTING STRUCTURE

BACKGROUND OF THE INVENTION

1. Field of the Invention

The present invention relates to an air bag, and more particularly to installing a bag and inflator in a retainer. Although an explanation will be given of an air bag device for a driver installed in a steering wheel, the same thing applies for other type air bag devices, e.g., air bags for a passenger, rear seat and door.

2. Description of the Prior Art

The schematic sectional view of a previously known air bag device is shown in FIG. 1 (refer to Japanese Patent Publication Sho. 63-199149).

Basically, the air bag comprises a bag 13 provided with a gas flowing orifice 11, a pad 15 for housing the bag 13 in the folded state, an inflator 17 arranged so as to permit gas to be jetted toward the gas flowing orifice 11 of the bag 13 and a retainer 21 provided with an inflator insertion hole 19 at the center thereof through which the inflator 17 can be inserted. The retainer 21 holds the inflator 17 and the bag 13 by the inner periphery thereof and the pad 15 by the outer periphery.

The inflator 17 and the bag 13 are attached to the retainer 21 as follows. Inside a flange 20 of the inflator 17 and the gas flowing orifice 11 of the bag 13, a bag holding ring 22 is inserted. Mounting bolts 23 attached onto the lower surface of the bag holding ring 22 are passed through corresponding attachment holes (not shown) formed at the peripheral edge of the gas flowing orifice 11 of the bag 13 and other attachment holes (not shown) formed in the retainer 21 and the flange 20 and tightened by nuts 25. In some cases, the holding ring 22 is riveted to the retainer 21 on the outside of the flange 20. The pad 15 is retained by the retainer 21 in such a manner that the side wall 15a extending downward is fixed to the outer periphery of the retainer 21 by rivets 41.

The above configuration, however, requires the bag holding ring for attaching the inflator and bag to the retainer and has many portions (normally, four portions) to be bolted and riveted. An increase in the number of components leads to an increase in the man hours of installing.

In order to solve the above problem, Japanese Patent Publication No. Hei. 3-153438 proposes an air bag device provided with an air bag body having a gas injection orifice; and a gas generator coupled with the gas injection orifice; wherein the gas generator is fixed to a base plate fixed on the fixing side, and the peripheral edge of the gas injection orifice being attached at the peripheral edge of the through-hole formed in the base plate; the air bag device characterized in that: an attachment portion is extended to the peripheral edge of the gas injection orifice of the air bag body in such a way that it is folded from the peripheral edge of the through-hole of the base plate to the back side of the base plate; at the attachment portion of the air bag, plural bolt holes are formed through which plural bolts for fixing the gas generator to the base plate can be passed; and the air bag body is sandwiched between the back side of the base plate and the gas generator with the bolts passed through the bolt holes formed at the attachment portion of the air bag body.

However, although in the air bag device having the above configuration, the bag holding ring is removed, the inflator and the bolts for holding the bag are required, thus increasing the number of components and the number of man-hours of installing.

SUMMARY OF THE INVENTION

In view of the above circumstance, the present invention intends to provide an air bag device which can remarkably reduce the number of components and the number of man-hours of installing.

There is provided with an air bag device comprising: a bag having a gas flowing orifice and a holding cloth below the gas flowing orifice; a pad for housing the bag in the folded state; an inflator arranged so as to permit gas to be jetted toward the gas flowing orifice of the bag; a retainer having an inflator insertion hole at the center thereof, the lower part of the inflator being inserted into the inflator insertion hole, and the retainer holding the inflator and the bag by the inner periphery of the inflator insertion hole and the pad by the outer periphery of the inflator insertion hole; and engagement/coupling means formed between the peripheral surface of the inflator and the peripheral edge of the inflator insertion hole, the peripheral surface of the lower holding cylinder of the inflator and the peripheral edge of the inflator insertion hole being engaged and coupled with each other to sandwich the holding cloth so that the inflator and the bag is held by the retainer.

The air bag device according to the present invention, which has the above structure, provides the following functional advantage.

Since a holding cloth for surrounding and holding the lower holding cylinder of the inflator below the gas flowing orifice of the bag is continuously formed, the peripheral surface of the inflator and peripheral edge of the inflator insertion hole of the retainer are engaged with each other so as to sandwich the holding cloth so that the inflator and the bag are retained by the retainer. Unlike before, for attachment of the inflator and the bag, bolting and rivetting are not required. This permits the number of components and the number of man-hours of installing to be reduced.

Japanese Patent Publication No. Hei. 5-270348 discloses a technique for retaining an inflator to a retainer in such a manner that a male screw formed on the outer periphery of the inflator and female screw formed in the inflator insertion hole of the retainer are screwed with each other. This technique, however, also requires bolting and rivetting to retain the air bag and pad to the retainer, and so cannot attain to reduce the number of components and the number of man-hours of installing which is the meritorious effects of the invention.

DETAILED DESCRIPTION OF THE PREFERRED EMBODIMENTS

Figure 1:
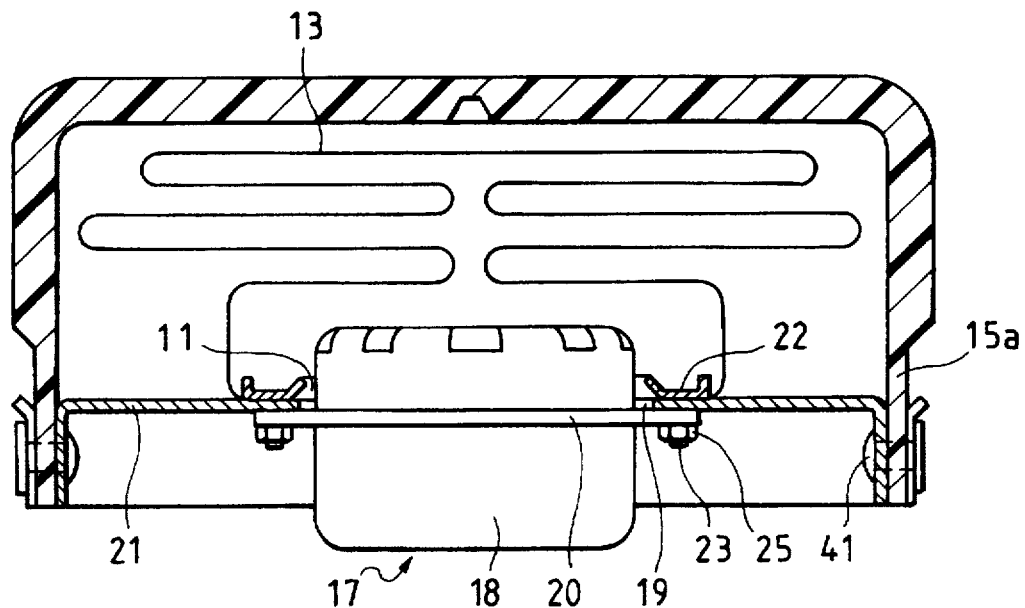
FIG. 1 is a schematic sectional view showing one embodiment of the prior art air bag device.

A detailed explanation will be given of an embodiment of the present invention. In the embodiment of the present invention, like reference numerals refer to like parts in the prior art so that a part or entity of them will not be explained here.

Figure 2:
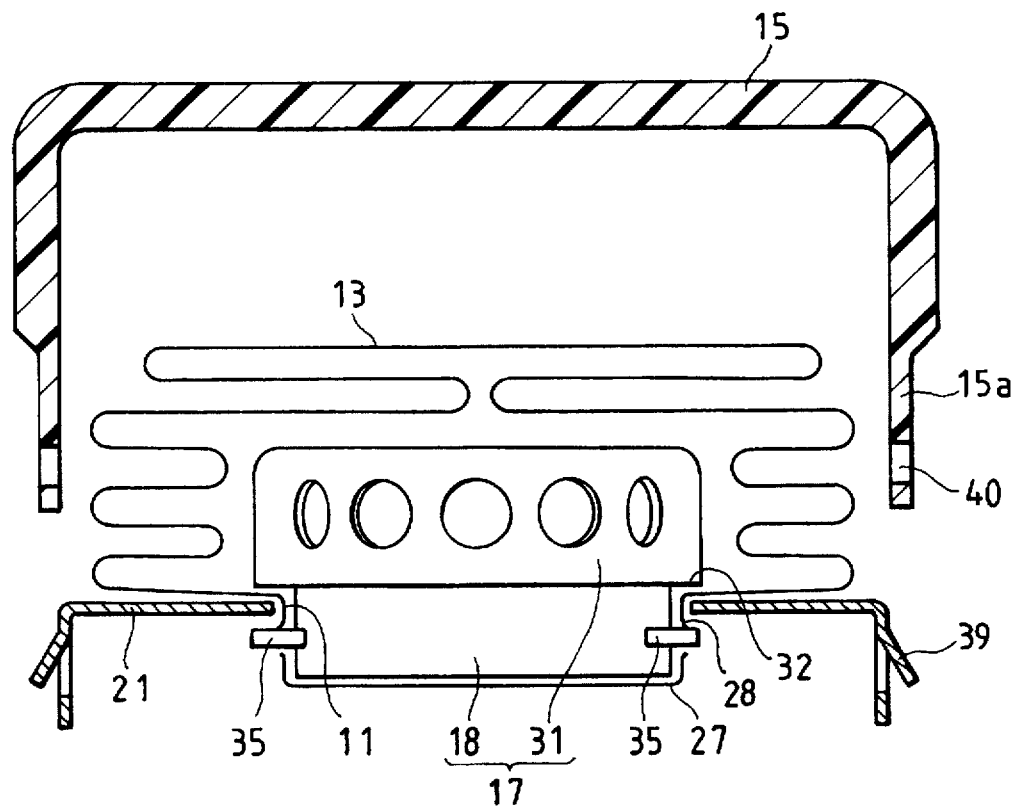
FIG. 2 is a schematic sectional view showing one embodiment of the air bag device according to the present invention (non-installing of the air bag)
Figure 3:
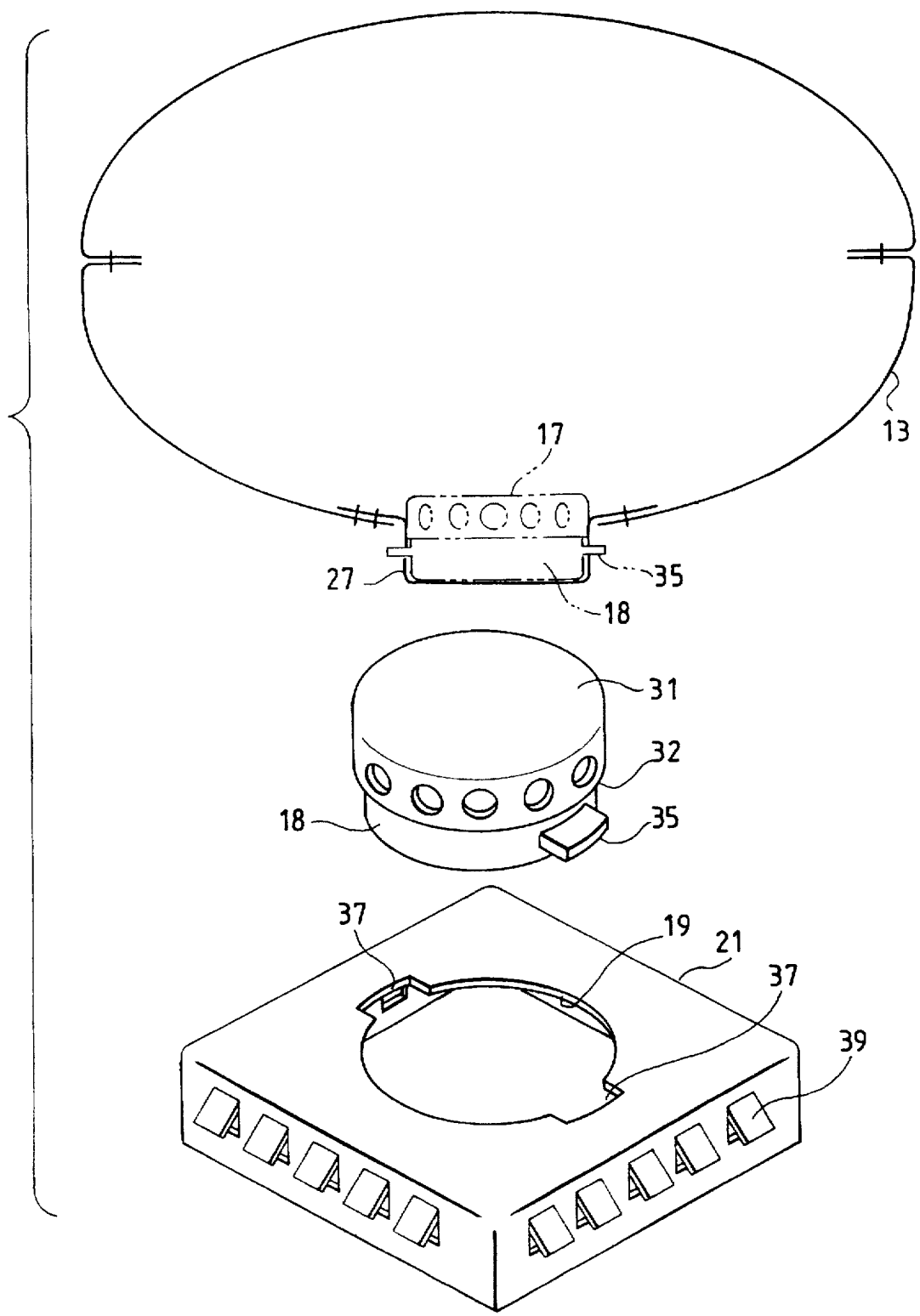
FIG. 3 is a perspective view showing respective members of the air bag device in FIG. 2 (the air bag is illustrated as a model)

An embodiment of the present invention is shown in FIGS. 2 and 3.

The air bag device according to the embodiment, as an upper concept, comprises a bag 13 provided with a gas flowing orifice 11, a pad 15 for housing the bag 13 in the folded state, an inflator 17 arranged so as to permit gas to be jetted toward the gas flowing orifice 11 of the bag 13 and a retainer 21 provided with an inflator insertion hole 19 at the center thereof into which a lower holding cylinder 18 of the inflator 17 can be inserted. The retainer 21 holds the inflator 17 and the bag 13 by the inner periphery thereof and the pad 15 by the outer periphery. This configuration is the same as the conventional configuration.

In the above configuration, the air bag device according to the embodiment includes a holding cloth 27 for surrounding the lower holding cylinder 18 of the inflator 17 formed continuously below the gas flowing orifice 11 of the bag 13, and engagement/coupling means formed between the peripheral surface of the lower holding cylinder 18 of the inflator 17 and peripheral edge of the inflator insertion hole 19 of the retainer 21.

The engagement/coupling means is a bayonet coupling means.

Figure 4:
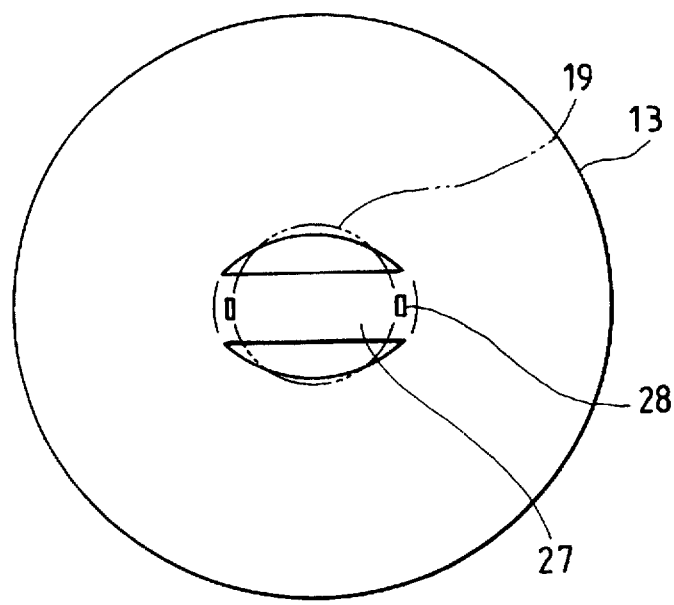
FIG. 4 is a bottom view of the bag when a cloth is formed as a sheet in the embodiment.
Figure 5:
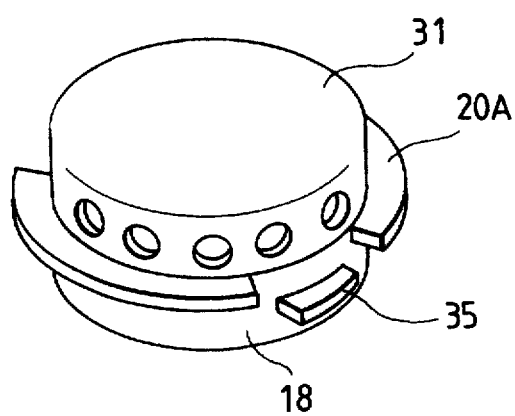
FIG. 5 is a perspective view of an inflator in another form which can be used in the embodiment of FIG. 2.

Specifically, the upper gas jet cylinder 31 of the inflator 17 has a larger diameter than that of the holding cylinder 18 so that a stopper step 32 is formed, and the holding cylinder 18 is equipped with a pair of engagement protruding pieces 35. On the other hand, in the periphery of the inflator insertion hole 19 of the retainer 21, removal recesses 37 corresponding to the engagement protruding pieces 35 are formed. Further, although not necessarily required, the holding cloth 27 has slits 28 for externally exposing the engagement protruding pieces 35. The periphery of each of the slits 28 is reinforced by stitching and/or reinforcement cloth.

Where the holding cloth 27 is to be made together with the bag cloth body from a sheet of cloth, as shown in FIG. 4, in order to insure the sealing performance, the orifice 11 preferably has an elliptic shape in contrast to the inflator insertion hole 19. Further, in the inflator 17 shown in FIG. 5, with the gas jet cylinder 31 and the holding cylinder 18 having equal diameters, the stopper step is formed as recess flanges 20A which can be formed by stamping.

An explanation will be given of the manner of installing the bag 13 and inflator 17 in the retainer 21 in the above embodiment.

First, with the inflator 17 wrapped by the holding cloth 27 from below, the holding cloth 27 is sewed at the gas flowing orifice of the bag 13. It should be noted that the engagement protruding pieces 35 protrude from the slits 28 of the cloth 27.

The holding cylinder 18 of the inflator 17 is inserted into the inflator insertion hole 19 of the retainer 21 until the stopper step 32 is applied to the peripheral edge of the inflator insertion hole 19 in such a manner that the engagement protruding pieces 35 of the inflator 17 are passed through the removal recesses 37 of the retainer 21. The inflator 17 is rotated together with the bag 3. Thus, the inflator 17 is held in the retainer 21 by bayonet coupling. Accordingly, the inflator and bag are held by the retainer in such a way that the peripheral surface of the holding cylinder 18 and the peripheral edge of the inflator insertion hole 19 are engaged and coupled with each other as to sandwiching the holding cloth 27.

Subsequently, the pad 15 is mounted in the retainer 21 by a known technique. In the embodiment shown, it is carried out in such a way that the receiving holes 40 formed on the peripheral wall of the pad 15 are engaged with pulling-up pieces 39 formed on the peripheral wall of the retainer 21.

The air bag device thus completed is attached, for its use, to a steering wheel by a known technique such as screwing. When the device is operated, because of gas jet from the gas jet cylinder 31 of the inflator 17, the inflator 17 is subjected to downward reaction force (pushing pressure). But since the reaction force is received by the stopper step 32, the inflator 17 will not come off from the retainer 21. Further, when the bag 13 expands by gas jet, the inflator 17 is subjected to upward pulling force. But, since the bag 13 surrounds the holding cylinder 18, i.e., is engaged with its bottom, it will not come off from the inflator 17. Then, the inflator 17 is also subjected to upward coming-off force through the bag 13. But since the engagement protruding pieces 35 are engaged with the lower face of the peripheral edge of the inflator insertion hole 19, the inflator 17 will not come off from the retainer 21.

FIGS. 6 to 12 show embodiments in which other engagement/coupling means are substituted for the bayonet coupling means in the above embodiment. The function of the air bag according to these embodiments is substantially the same as that shown in FIG. 2.

Figure 6:
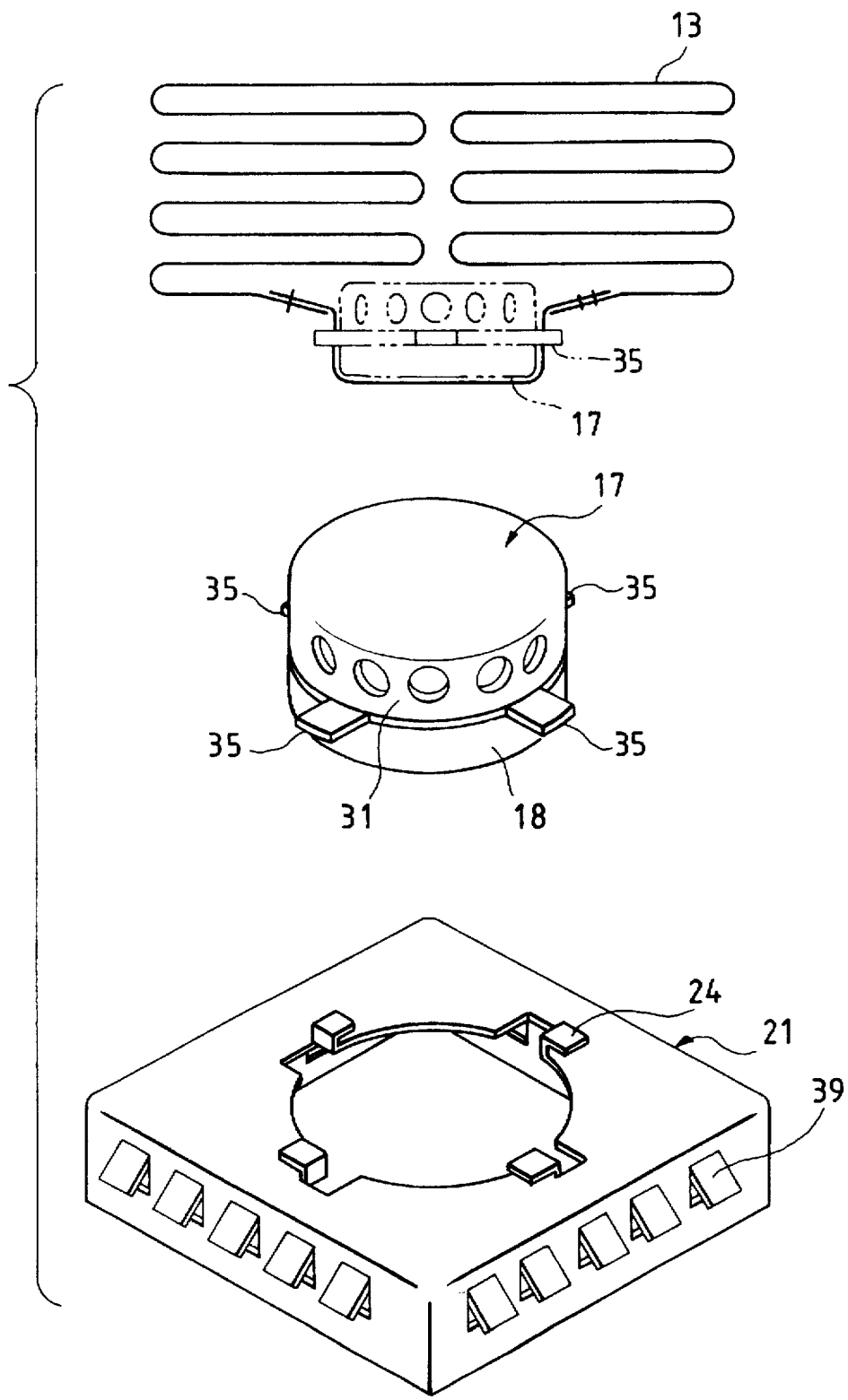
FIG. 6 is a perspective view showing the respective members of the engagement/coupling means in still another form in the embodiment of FIG. 2 (the air bag is illustrated as a model)

In the embodiment shown in FIG. 6, the inflator 17 is provided with four engagement pieces. Correspondingly, receiving pieces 24, pulled up in a reverse direction in the peripheral edge of the inflator insertion hole 19, are formed. In such an installing manner, the engagement protruding pieces 35 are slid on the upper surface of the retainer 21 so as to be engaged with the receiving pieces 24. The receiving pieces 24 serve to stop the upward movement of the inflator 17, whereas the upper surface of the retainer 21 serves to stop the downward movement of the inflator 17.

Figure 7:
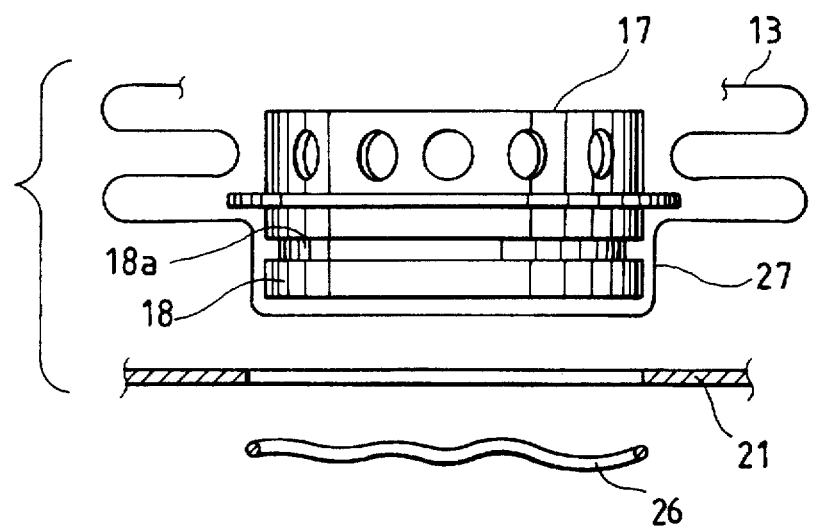
FIG. 7 is a perspective view showing the respective members of the engagement/coupling means in still another form in the embodiment of FIG. 2.

In the embodiment shown in FIG. 7, the holding cylinder 18 of the inflator 17 has an engagement groove 18a. A spring retaining ring 26 which is engageable with the engagement groove 18a through the holding cloth 27 is prepared as a separate member. After the holding cylinder 18 of the inflator 17 surrounded by the holding cloth 27 is inserted into the inflator insertion hole 19, the spring retaining ring 26 is fit in the engagement groove 18a of the holding cylinder 18. In this case, the coming-off force for the inflator 17 from the inflator insertion hole 19 is generally smaller than in each of the above embodiments. But, when the bag 13 expands, the inflator 17 is subjected to the upward coming-off force through the bag 13. Then, since the coming-off force is much smaller than the reaction force received by the inflator during gas jet, the inflator 17 will not come off from the retainer 21.

Figure 8:
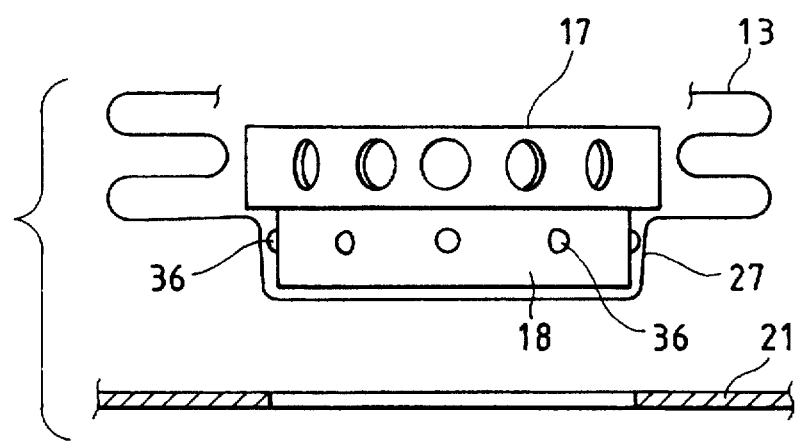
FIG. 8 is a perspective view showing the respective members of the engagement/coupling means in a further form in the embodiment of FIG. 2.

In the embodiment shown in FIG. 8, the holding cylinder 18 of the inflator 17 has plural spherical engagement protrusions 36. The holding cylinder 18 of the inflator 17 surrounded by the holding cloth 27 can be inserted in the retainer 21 in such a manner that the protrusions 36 bend the circular edge of the inflator insertion hole 19 like a spring. Thus, the inflator 17 surrounded by the holding cloth 27 can be held in the retainer 21 with a single motion. In this case, the coming-off force for the inflator 17 from the inflator insertion hole 19 is relatively small as in the example of FIG. 7. In this case also, the inflator 17 will not come off from the retainer 21 for the same reason as described above.

Figure 9:
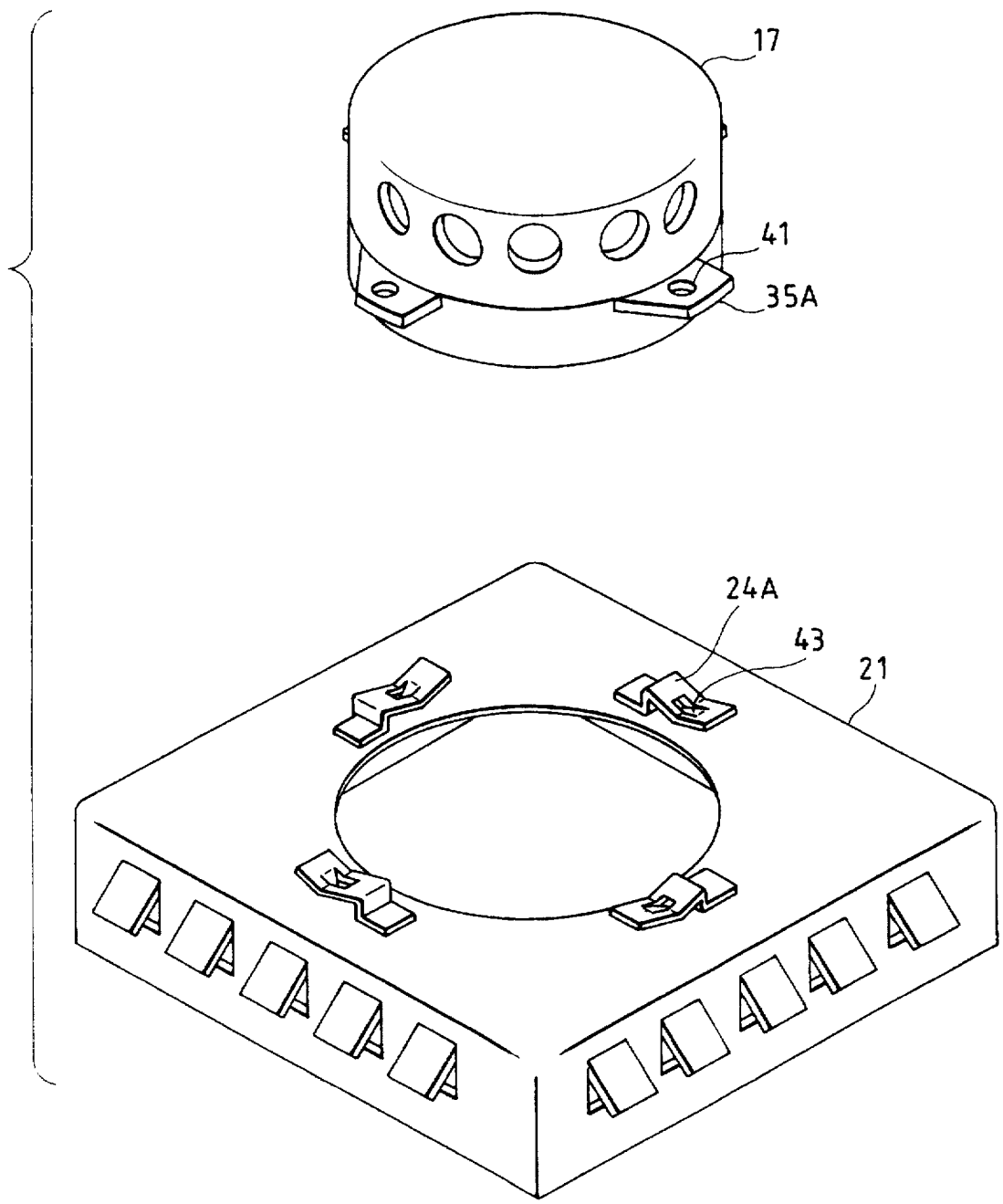
FIG. 9 is a perspective view showing the respective members of the engagement/coupling means in a further form in the embodiment of FIG. 2.

In the embodiment shown in FIG. 9 which is a modification of FIG. 6, stopper holes 41 are formed in the engagement protrusion pieces 35A of the inflator 17. Correspondingly, stopper protrusions 43 are formed on the lower surfaces of receiving pieces (made of spring plate) 24A. The receiving pieces 24A are formed as separate members instead of by pulled-up members. In the embodiment shown, the stopper grooves 41 are formed as through-holes, and the stopper protrusions 43 are formed as rivets. But, the stopper grooves 41 may be simply recesses and the stopper protrusions may be formed as pulled-up members.

Such a configuration makes it easy to position the inflator 17 on the retainer 21, and increase attaching stability in a rotating direction. This installing structure is the same as in FIG. 6.

Figure 10:
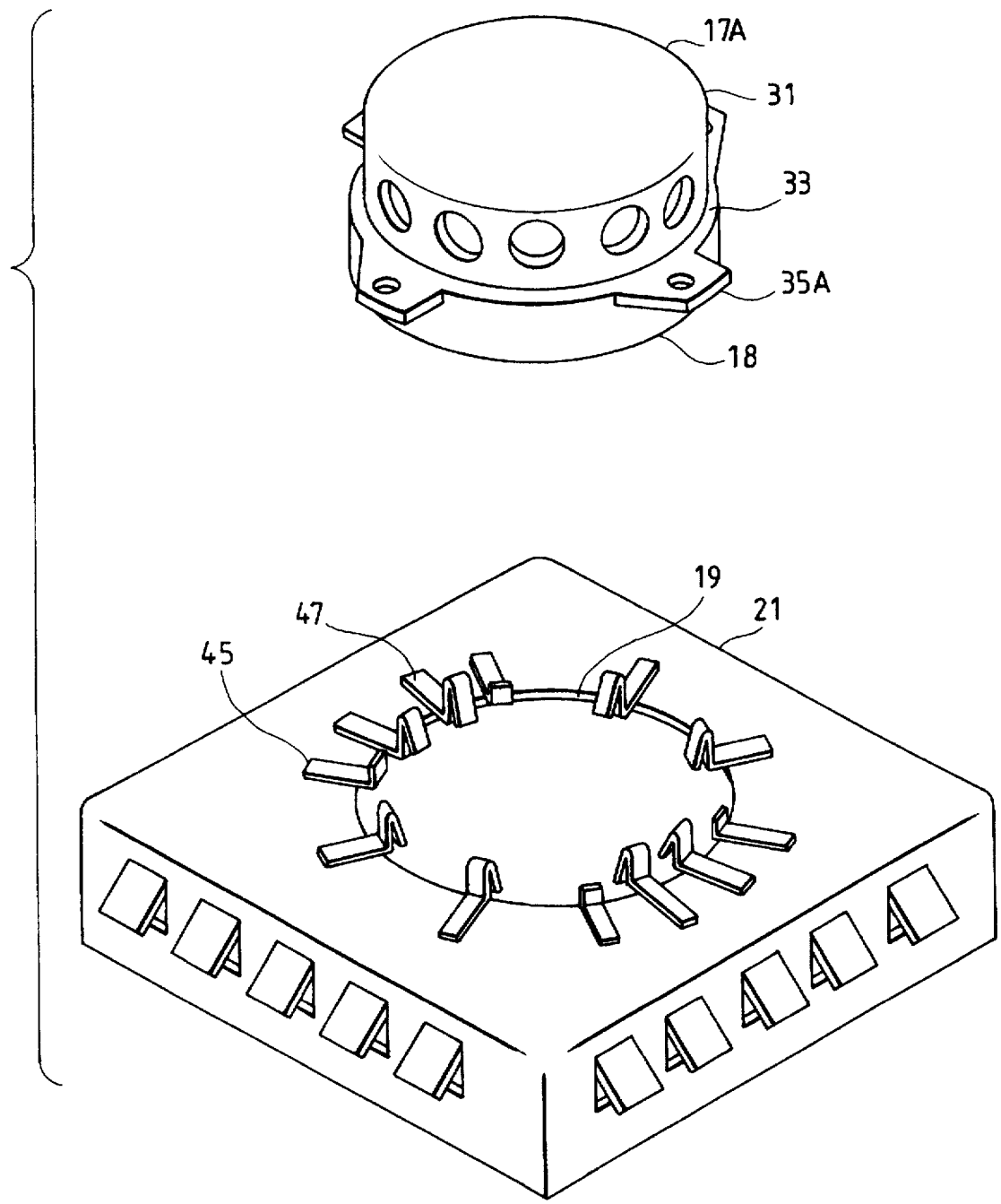
FIG. 10 is a perspective view showing the respective members of the engagement/coupling means in a further form in the embodiment of FIG. 2.

In the embodiment shown in FIG. 10, an inflator 17A includes the holding cylinder 18 having a larger diameter than that of the gas jet cylinder 31 and having an upward stopper step 33. At the peripheral edge of the inflator insertion hole 19 of the retainer 21 are formed plural (four in the embodiment shown) guide protrusions 45 made of separate band plate members and plural (eight in the embodiment shown) hook-shaped spring stopper pieces 47. In this case, an installing operation is carried out as follows. At the positions where the engagement protrusions 35A of the inflator 17A do not interfere with the guide protrusions 45 and the stopper pieces 47, the holding cylinder 18 is located concentrically with the inflator insertion hole 19 along the guide protrusions 45, and the inflator 17A is inserted into the retainer 21 until the engagement protrusions 35A are applied on the upper surface of the stopper step 33.

The engagement of the stopper pieces 47 with the stopper step 33 serves to stop the upward movement of the inflator 17, whereas the engagement of the engagement protrusions 35 of the inflator 17A with the upper surface of the retainer 21 serves to stop the downward movement of the inflator 17A.

Although the guide protrusions 45 and the stopper pieces 47 are formed as separate members in the embodiment shown, they may be formed integrally by e.g. pulling-up technique when the retainer 21 is formed.

Figure 11:
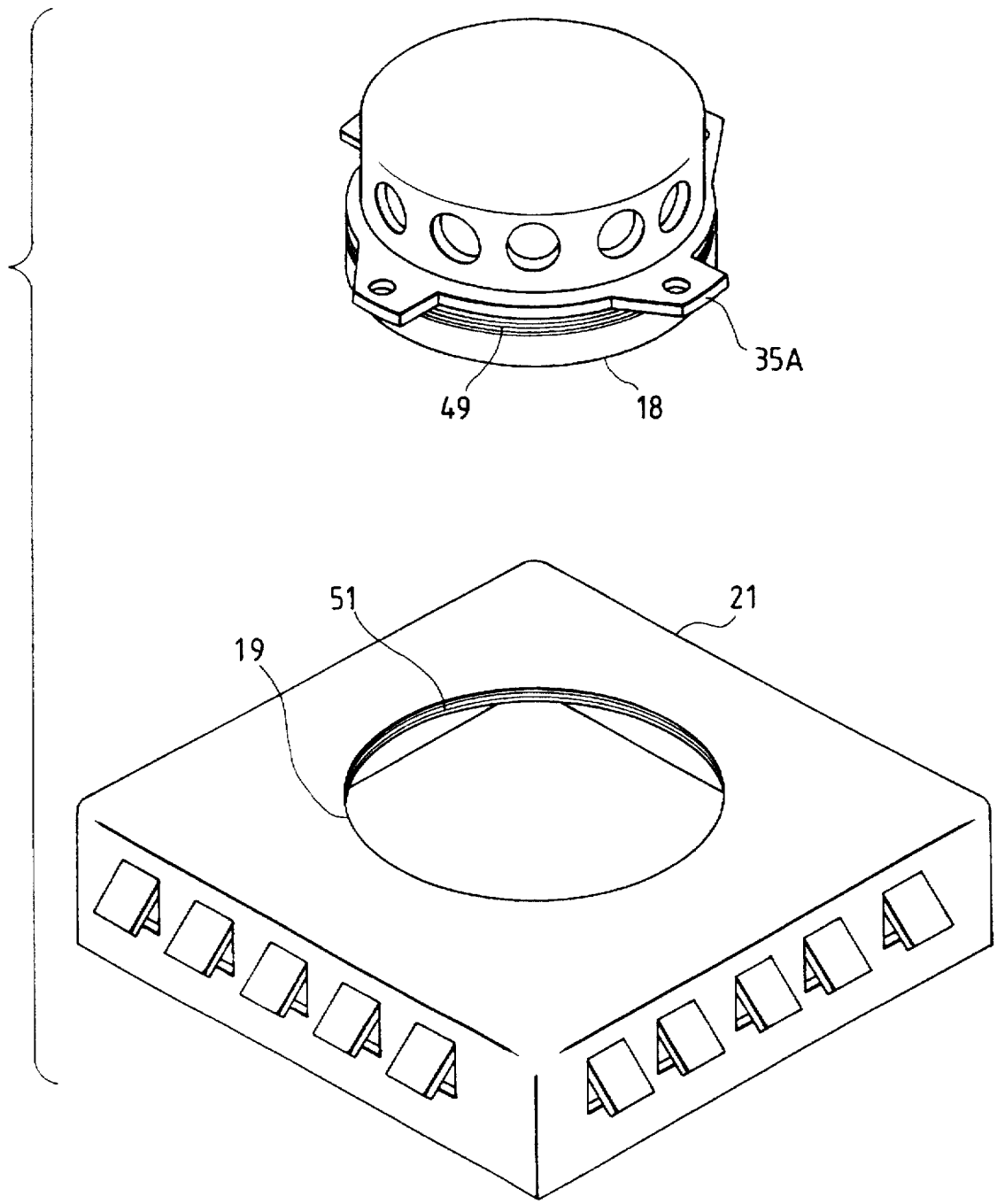
FIG. 11 is a perspective view showing the respective members of the engagement/coupling means in a further form in the embodiment of FIG. 2.

In the embodiment shown in FIG. 11, the inflater 17A has the same shape as in FIG. 10. On the outer periphery of the holding cylinder 18 having a larger diameter, a male screw portion 49 is formed. Correspondingly, a female portion 51 is formed on the inner peripheral edge of the inflator insertion hole 19 of the retainer 21. The pitch and clearance of the male screw portion 49 and the female screw portion 51 are such determined that they can be screwed through the holding cloth 27. The installing operation is carried out in such a manner that the male screw portion 49 of the inflator 17A surrounded by the holding cloth 27 is screwed with the female screw portion 51 of the retainer 21 until the engagement protrusions 35A are applied on the upper surface of the retainer 21.

The screwing of the male screw 49 and the female screw 51 serves to stop the upward movement of the inflator, whereas the engagement of the engagement protrusions 35A and the upper surface of the retainer 21 serves to stop the downward movement of the inflator.

Figure 12:
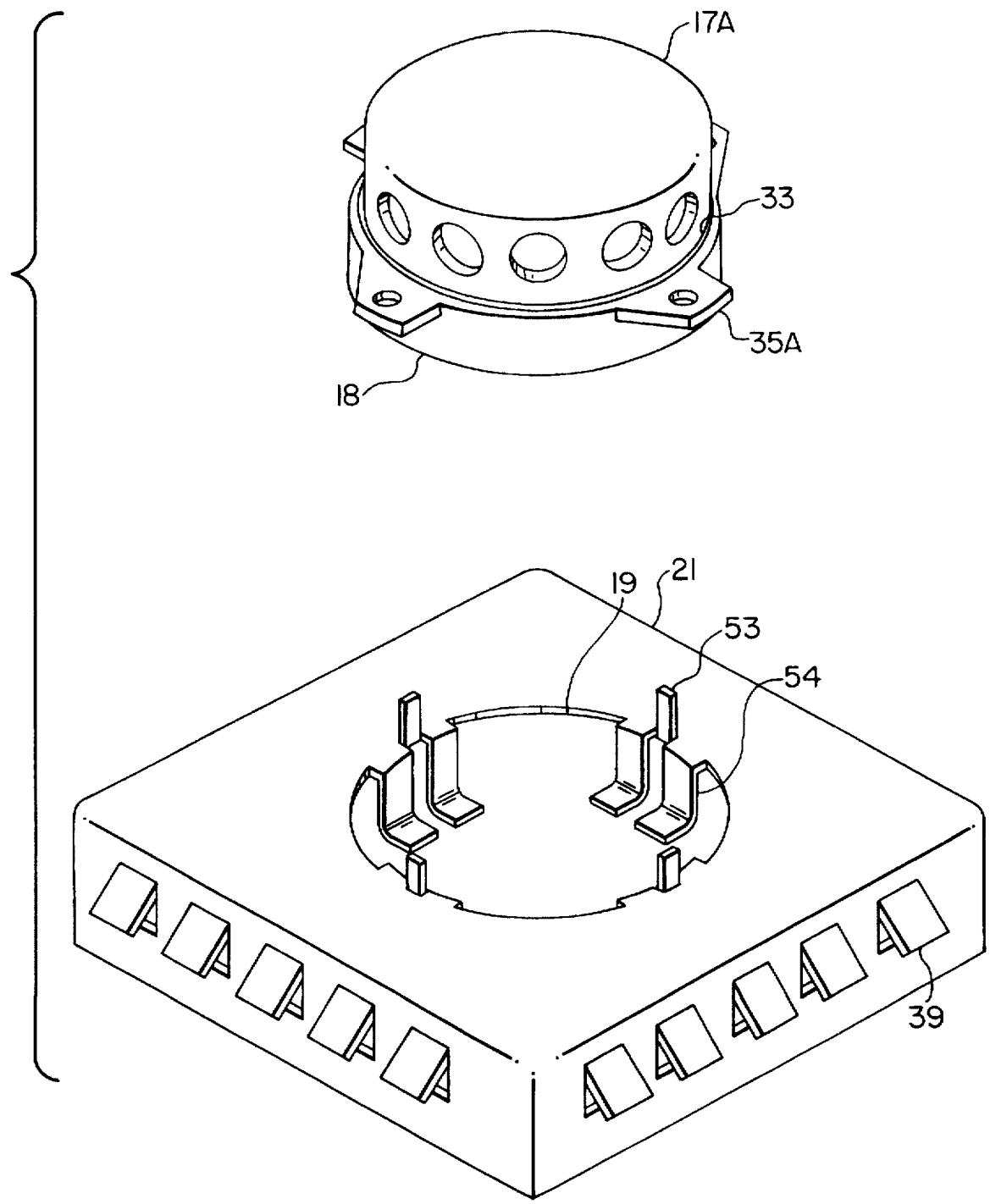
FIG. 12 is a perspective view showing the respective members of the engagement/coupling means in a further form in the embodiment of FIG. 2.

In the embodiment shown in FIG. 12, the inflator 17A has such a shape as shown in FIG. 10. At the peripheral edge of the inflator insertion hole 19 of the retainer 21 arranged are plural holding spring arms 54 whose lower portions are bent inwardly and plural caulking stop pieces 53.

The installing operation is carried out in such a manner that the inflator 17A is inserted into the inflator insertion hole 19 of the retainer 21 and the caulking stop pieces 53 are caulked to be engaged with the stopper step 33 of the inflator 17A.

The engagement of the stop pieces 53 with the stopper step 33 serves to stop the upward movement of the inflator 17A, whereas the engagement of the engagement protrusions 35A and the upper surface of the retainer 21 serves to stop the downward movement of the inflator 17A. Incidentally, the holding springs 54 spring-hold the insertion cylinder 18 of the inflator 17A to prevent rattling of the inflator 17A.

Figure 13:
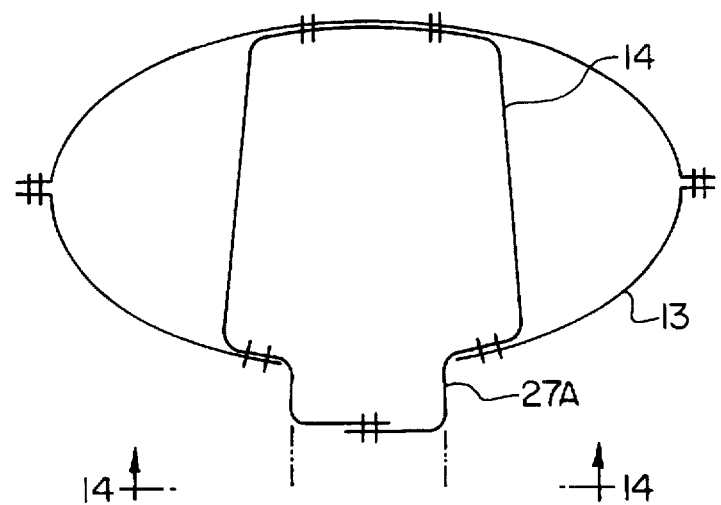
FIG. 13 is a bag sectional model view in another form which can be used in the embodiment of FIG. 2.
Figure 14:
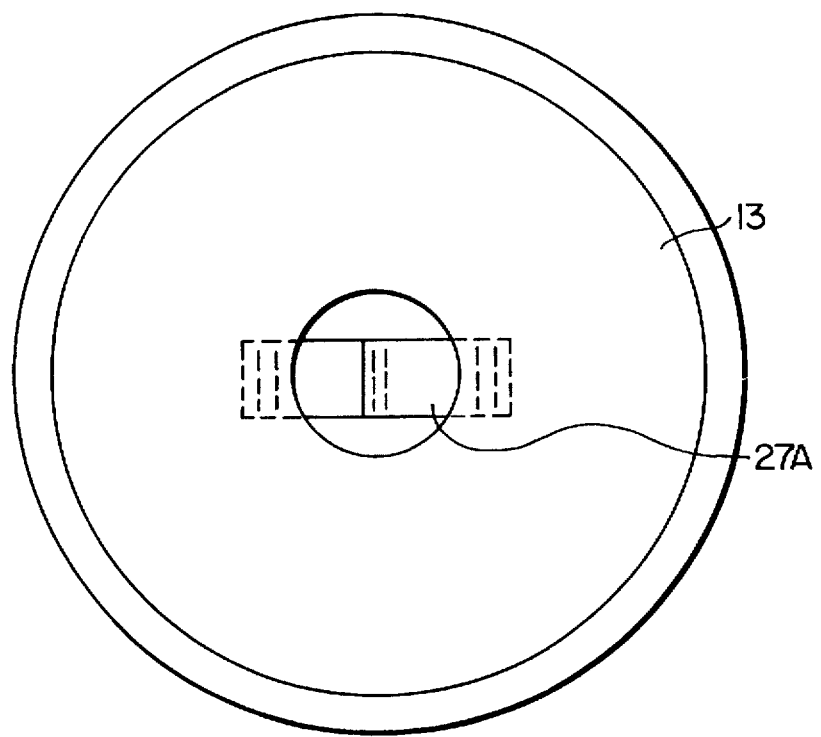
FIG. 14 is a view taken along line 14—14 of FIG. 13.

FIGS. 13 and 14 show a modification of the bag in the above embodiments. The holding cloth 27A is so formed for relax shock in air bag expansion that a strap 14 is extended to be sewed at the ceiling side of the air bag and the gas flowing orifice. Since the holding cloth 27A is formed by extension of the strap 14, without using a separate member, the portion (holding cloth) 27A extended from both lower ends of the strap 14 can be post-sewed, thus making it easy to fabricate an inflator/bag module.

The halves of the bag 13 may be sewed in their peripheries externally as shown.

What is claimed is:

1. An air bag device comprising:
   an air bag having a gas inlet orifice and a holding cloth attached so as to extend below and across the gas inlet orifice;
   a pad for enclosing said bag in a folded state;
   an inflator arranged so as to permit gas to be jetted toward the gas inlet orifice of said bag;
   a retainer having an inflator insertion hole located at a central area thereof, said inflator being inserted into the inflator insertion hole, said retainer holding said inflator and said bag by an inner periphery of said inflator insertion hole, said pad being secured to said retainer; and
   said inflator being releasably coupled to said retainer, said holding cloth being positioned to completely surround at least a portion of said inflator and be retained by said retainer.

2. The air bag device according to claim 1, wherein said holding cloth is extended so as to bridge between a top side of said air bag and said gas inlet orifice.

3. An air bag device as in claim 1 wherein said holding cloth crosses beneath said gas inlet orifice and inflator.

4. An air bag device comprising:

an air bag having a gas inlet orifice and a holding cloth attached so as to extend below and across said gas inlet orifice;

an inflator arranged to permit gas to be jetted toward said gas inlet orifice; and a retainer having a centrally positioned inflator insertion hole;

said inflator is inserted into said inflator insertion hole and releasably coupled to said retainer, said holding cloth extending completely around at least a portion of said inflator so that said holding cloth is sandwiched between said inflator and said retainer.

5. The air bag device according to claim 4, wherein said holding cloth is extended so as to bridge between a top side of said air bag and said gas inlet orifice.

6. An air bag device as in claim 4 wherein said holding cloth crosses beneath said gas inlet orifice and said inflator.

* * * * *